United States Patent [19]
Perez

[11] Patent Number: 5,375,706
[45] Date of Patent: Dec. 27, 1994

[54] COMPACT DISC CARRYING CASE

[76] Inventor: Steven M. Perez, 220 Sierra Blvd., Roseville, Calif. 95678

[21] Appl. No.: 148,652

[22] Filed: Nov. 5, 1993

[51] Int. Cl.$^5$ .............................................. B65D 85/57
[52] U.S. Cl. .................................... 206/309; 206/312; 206/425; 206/444; 312/9.48; 312/9.52
[58] Field of Search ............... 206/309, 310, 311, 312, 206/387, 425, 444, 456, 472, 473, 488, 484; 312/9.47, 9.48, 9.52, 9.55

[56] References Cited

U.S. PATENT DOCUMENTS

| | | |
|---|---|---|
| D. 308,130 | 5/1990 | Sherry . |
| 1,013,916 | 1/1912 | Wiswell . |
| 2,972,507 | 2/1961 | McCay ................... 206/215 |
| 3,870,148 | 3/1975 | Hite . |
| 4,387,802 | 6/1983 | Shearing et al. . |
| 4,425,997 | 1/1984 | Grant ..................... 206/456 |
| 4,694,957 | 9/1987 | Ackeret . |
| 4,762,225 | 8/1988 | Henkel . |
| 4,807,749 | 2/1989 | Ackeret ................. 206/309 |
| 4,892,189 | 1/1990 | Kunimune et al. . |
| 5,191,977 | 3/1993 | Markovitz ............. 312/9.48 |
| 5,201,414 | 4/1993 | Kaszubinski ......... 206/425 |
| 5,232,089 | 8/1993 | Kim . |
| 5,238,112 | 8/1993 | Massey et al. ........ 206/387 |

FOREIGN PATENT DOCUMENTS

| | | | |
|---|---|---|---|
| 4128925 | 12/1992 | Germany ............. | 206/310 |
| 4-18285 | 4/1992 | Japan . | |
| 1316042 | 6/1987 | U.S.S.R. ............. | 206/387 |

Primary Examiner—David T. Fidei
Attorney, Agent, or Firm—Joseph E. Gerber

[57] ABSTRACT

A carrying case for planar, rectangular articles of minimal thickness, such as the housings in which audio compact discs are packaged, is disclosed. The carrying case includes a housing comprised of six rectangular side panels, five of which are integrally bound into a fixed rectilinear relation with one-another, leaving a remaining sixth side open, the sixth side panel being hingedly fixed adjacent the housing's open side to one of the five fixed side panels. Hook and loop fabric fasteners on the housing, and on a hinged closure flap of the sixth panel, permit the sixth side panel to cover the open sixth side securely. A plurality of drawers is slidably disposed within the housing upon opposed pairs of drawer supports comprised of tracks and runners. Each drawer has a bottom, and upstanding front, rear and side walls. Each also includes a plurality of thin, upstanding rectilinearly-oriented fences dividing the drawer's interior space, into nine compartments. An opening is provided in the drawer bottom within each compartment, and an opposed pair of semicircular cutouts in the front wall of each drawer serves as a drawer pull.

27 Claims, 2 Drawing Sheets

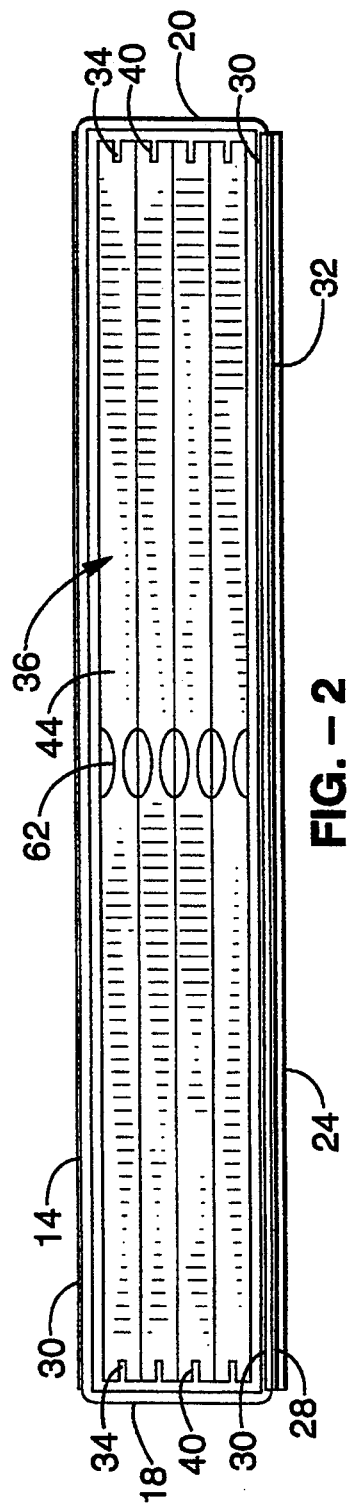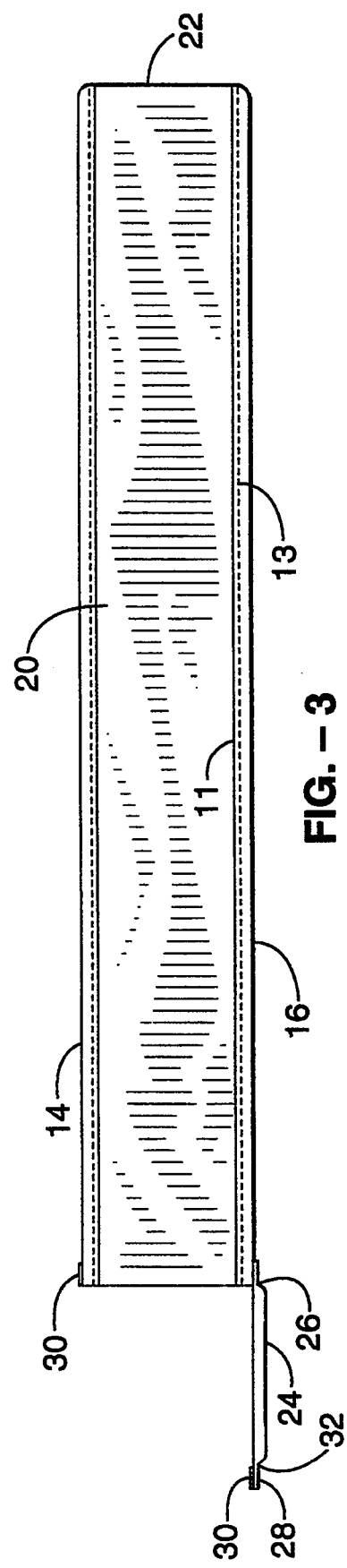

COMPACT DISC CARRYING CASE

BACKGROUND OF THE INVENTION

1. Field Of The Invention

The present invention relates generally to carrying cases for planar articles, and more specifically to a carrying case for audio compact discs.

2. Description Of The Related Art

Consumers of every technological era have been challenged by the need to store and transport all manner of articles comprising media upon which sounds, images or data are recorded. Today's consumer is particularly challenged with the need for article carrying cases having particular suitability for storing such media in a manner convenient to access while driving an automobile.

The need and practicality of carrying music media for use in an automobile arose with the advent of the 8-track tape cartridge, and was followed by the more convenient minicassette. For the storage and transport of these media, a myriad of designs have been proposed upon several primary themes including folders, tote bags, briefcases and suitcases, some being multiply divided to retain the media in a particular order.

Currently, with the introduction of compact audio disc media, the mobile consumer has been offered a whole new frontier of music transport and storage density. However, such compact discs, as they are presently packaged, are sometimes difficult to manipulate. Further, some of the indicia on the housings thereof identifying the nature and content of the audio recording therewithin is in small type and therefore very difficult to read. This presents a formidable practical problem in a whole class of storage and transport formats wherein a narrow edge of the housing bearing such small type is the only surface presented to the user for viewing and choosing a selection. This problem is exemplified in the device disclosed in U.S. Pat. No. 4,762,225 issued to Henkel in 1988. Therein, to avoid reading small type, a user must shuffle through the individual disc housings to confirm a selection.

By far, a better manner of presentation appears to be one in which the user is permitted to view one of a compact disc housing's broad faces where larger typefaces are commonly used along with additional identifying indicia such as photographic or other graphic representations. Such presentation of the broad face of a compact disc housing has been employed in apparatus disclosed in U.S. Pat. No. 4,892,189 issued to Kunimune in 1990. Therein, twin, hinged, opposed mating shells having four housing receptacles apiece are proposed for storing, transporting and displaying audio compact discs. However, this configuration has an inherent limitation in that only two such opposed mating shells may be used with one another. Further, to access the compact disc housings within a case such as that in the Kunimune patent, one must swing one shell into a ninety-degree orientation to the other, thus requiring a relatively large volume of space for operating the case as it is intended to be used. This is a drawback in that, for example, it would require one to refrain from piling other articles on top of such a case if access to the contents thereof was later desired.

Thus, there exists a need for a compact disc storage and carrying case able to present compact disc housings in an easily-readable orientation. Further, such a case should be able to store a fair number of such items, but it should not require an undue amount of space for proper operation and access to its contents. And, ideally, this case should be capable of being stowed in more than one orientation while still permitting its contents to be accessed.

SUMMARY OF THE INVENTION

The compact disc carrying case of the present invention is adapted to overcome the above-noted shortcomings and to fulfill the stated needs. In its essence, the invention is a carrying case for planar, rectangular articles, first comprising a housing. The housing of the case has an open side, and a panel having dimensions sufficient to close the open side hingedly affixed adjacent thereto. And, means for releasably fastening the hinged closure panel in a closed position are also provided. The case further includes means for supporting at least one drawer therewithin, and at least one drawer slidably engaged with those means. Each drawer includes means for dividing its interior space into a plurality of rectangular article compartments, and an opening in the drawer's bottom is provided in each of those compartments. Finally, a non-projecting drawer pull is provided in the front wall of each drawer.

It is an object of the present invention to provide a compact disc case able to present the most easily-readable, broad faces of compact disc housings in a convenient storage and transport format.

It is a further object of the present invention to provide a compact disc case able to be used in a minimum volume of space.

Yet another object of this invention is to provide a compact disc case able to be stowed in a horizontal orientation with other articles stacked thereupon, while still permitting access to its contents.

Yet a further object of the present invention is to provide a compact disc case able to be stowed in an alternative, vertical orientation, while continuing to permit easy and convenient access to its contents.

Still further objects of the inventive compact disc carrying case disclosed and claimed herein will be apparent from the drawings and following detailed description thereof.

BRIEF DESCRIPTION OF THE DRAWINGS

FIG. 2 is a front elevation of the compact disc carrying case of FIG. 1, with its closure flap open for access to its drawers.

FIG. 3 is a side elevation of the compact disc carrying case of FIG. 1, with its closure flap open.

DESCRIPTION OF THE PREFERRED EMBODIMENT

Figure 1:
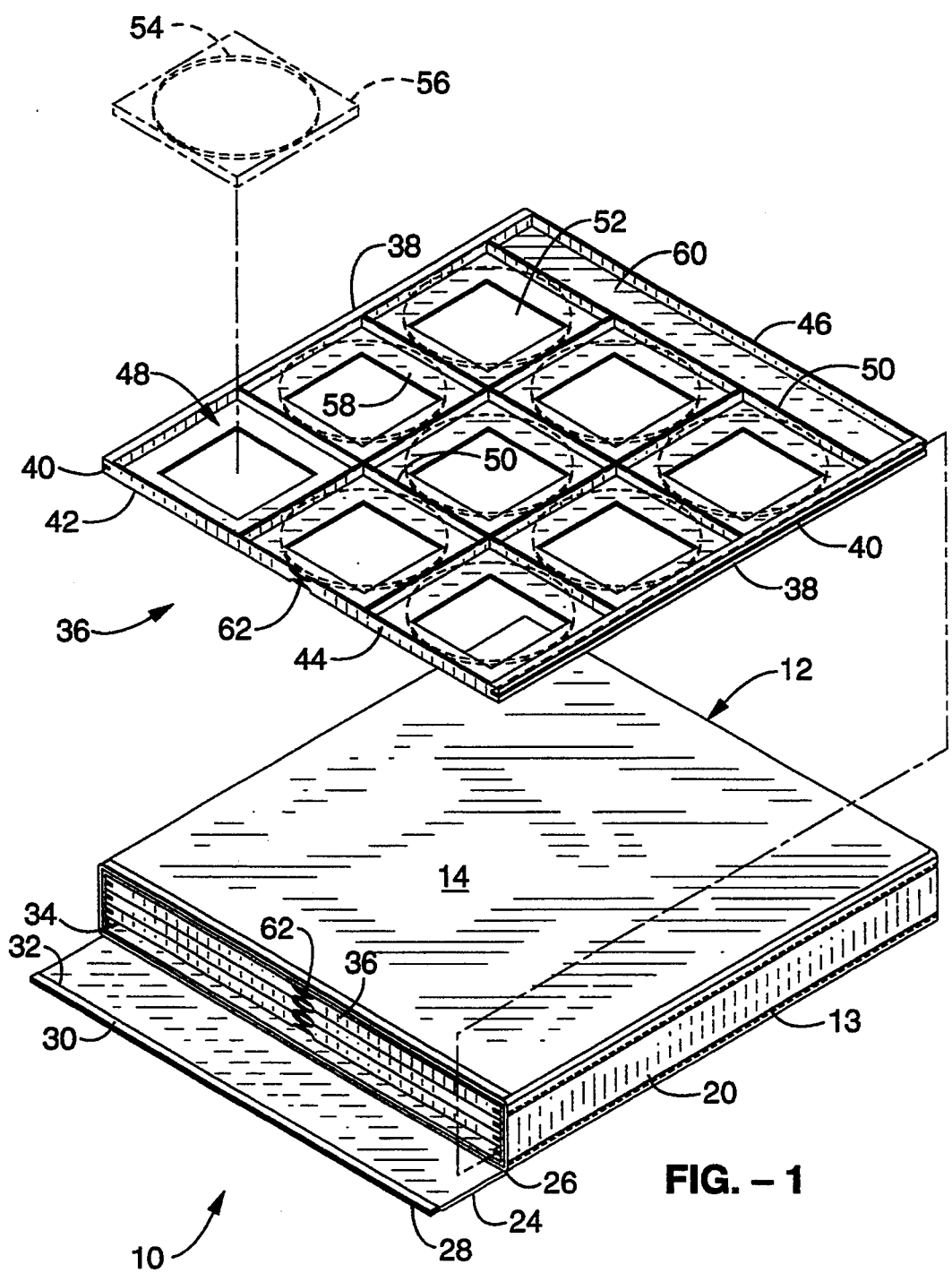
FIG. 1 is an exploded perspective view showing the compact disc carrying case of the invention with its closure flap in an open orientation, one drawer thereof being removed and suspended thereabove, a compact audio disc housing being, yet further, suspended above the drawer and shown in phantom line.

Referring now specifically to the drawings, FIGS. 1, 2 and 3 show the compact disc carrying case of the invention, which is generally identified herein with the reference numeral 10. Compact disc carrying case 10 includes a rectilinear housing 12 which is preferably of rigid construction. Plastic is the material of choice for housing 12, as it is for the other rigid parts of carrying case 10. However, other rigid materials such as aluminum and other equivalents known in the art may also suffice. And, these may be used as the exclusive rigid material of the construction, or they may be combined in any manner necessary to serve needs of convenience, simplicity, efficiency or economy in manufacture of carrying case 10.

Housing 12 also preferably includes a padded outer surface treatment 11 which may be of an convenient and workable type known in the art including, but not limited to combinations of fabric and open or closed-celled resilient foam in separate or bound layers. Further, application of such treatment to the surface of housing 12 may be by stitching 13, adhesives or other known expedients.

Housing 12 is comprised of five rigid rectangular panels, a first and second of which act as its top 14 and bottom 16. Top and bottom panels 14 and 16 are of like dimensions and fixed in opposed parallel relation to one another. A third and fourth of said panels act as housing 12's left and right sides, 18 and 20, respectively. Left and right sides, 18 and 20, are also of like dimensions and fixed in opposed parallel relation to one another. A fifth rigid panel 22 is fixed in perpendicular relation to one of the contiguous edges of the top 14, bottom 16, left side 18 and right side 20, to act as a rear wall. Thus, rear panel 22, along with the other four panels, thereby defines a rectilinear cavity within housing 12. The conventions of direction, top, bottom, left, right, front and rear, and the like, used in this specification and in the claims, should be understood to apply to carrying case 10 as it is shown in the drawings, i.e. resting upon a horizontal supporting surface in its most natural orientation for access to the compact discs intended to be stored in the drawers therewithin.

Housing 12 also includes a closure. Rectangular panel 24 is of substantially the same dimensions as rear panel 22, and is affixed to housing 12 adjacent its open front via hinge 26. Thus, when in a closed orientation, panel 24 serves as a front wall of housing 12.

As best distinguished in FIG. 3, the means for fastening and retaining front panel 24 in a closed position include a closure flap 28, and a pair of mating hook and loop fabric strips 30. Closure flap 28 is preferably a semi-rigid strip of textile fabric affixed to front panel 24 at hinge 32. However, closure flap 28 may alternatively be constructed of more rigid materials, as long as hinge 32 is provided to permit closure flap 28's inner face to seat along the forward edge of top panel 14.

The forward edge of top panel 14 bears one of the pair of mating hook and loop fabric strips 30. The other mating strip 30 is disposed on closure flap 28's inner face. Thus, mating strips 30 register with one another when front panel 24 is in a closed orientation and closure flap 28 is properly seated.

The inner surfaces of left and right side panels 18 and 20 include a plurality of opposed pairs of perpendicularly-projecting longitudinal runners 34. Each runner is preferably a rigid fin-like projection, integrally bound with its respective side wall 18 or 20. Each opposed pair of runners supports a drawer 36.

Referring to FIG. 1, each drawer 36 includes upstanding side walls, each such side wall being identified generally with the reference numeral 38 herein. Each drawer side wall 38 includes a longitudinal track 40 along its entire length, the dimensions of track 40 being such as to permit it to mate securely with a runner 34 inside housing 12.

Each drawer 36 is rectangular and generally planar in its configuration. In addition to side walls 38, each drawer 36 includes a bottom wall 42, and upstanding front and rear walls, 44 and 46, respectively.

The interior of each drawer is divided into a plurality of discrete, rectangular compartments 48 by several thin, rectilinearly-disposed, upstanding fences 50. Each compartment 48 is preferably dimensioned in its depth and perimeter to hold a single compact audio disc housing in snug engagement therewith. It is preferred that drawer 36 be divided into nine such compartments 48 arranged in a three-square configuration.

Within each compartment 48, an opening 52 is provided in its bottom wall 42 for the purpose of permitting easy finger access in the act of removing a compact disc 54, with its housing 56, from drawer 36. As is evident in FIG. 1, the bottom of each compartment 48 is not entirely open; each includes a supporting skirt 58 to support each stored disc housing 56 and to lend rigidity to drawer 36, in general.

The rear of drawer 36 includes a support margin 60 to help assure that when drawer 36 is drawn out of housing 12, runners 34 and tracks 40 do not become disengaged.

Finally, each drawer 36 is provided with a non-projecting drawer pull in the form of an opposed pair of cutouts in its front wall 44. A drawer pull of such construction has the multiple advantages of being able to be easily grasped with the fingertips, yet it does not inhibit the closure of front wall 24 and it does not increase the overall dimensions of carrying case 10.

The foregoing detailed disclosure of the inventive compact disc carrying case 10 is considered as only illustrative of the preferred embodiment of, and not a limitation upon the scope of, the invention. Those skilled in the art will envision many other possible variations of the structure disclosed herein that nevertheless fall within the scope of the following claims. For example, many other means for supporting drawers within a housing are known, and other closures and fasteners for front wall are well within the skill in the art. Further, it is contemplated that any combination of handles, straps, outside auxiliary pockets and the like may be added for further convenience in using the inventive carrying case disclosed herein. And, it is specifically envisioned that a long shoulder strap, the ends of which are affixed to carrying case 10's side walls, 18 and 20, would be of particular utility.

It is also envisioned that alternative uses for this inventive article carrier may later be realized. Accordingly, the scope of the invention should be determined with reference to the appended claims, and not by the examples which have herein been given.

I claim:

1. A carrying case for planar, rectangular articles, comprising:
   a. a housing having an open side;
   b. a panel hingedly affixed to said housing adjacent said open side, said panel having dimensions sufficient to close said open side;
   c. means for releasably fastening said hinged panel in a position to close said housing's open side;
   d. means for supporting a drawer within said housing;
   e. a drawer slidably engaged with said drawer supporting means;
   f. means within said drawer for dividing said drawer's interior space into a plurality of rectangular article compartments;

g. an opening in said drawer's bottom within each said article compartment; and, h. a non-projecting drawer pull in a front wall of said drawer.

2. The carrying case of claim 1, wherein said housing is rectilinear.

3. The carrying case of claim 1, wherein said housing is comprised of five rectangular panels integrally bound into a fixed rectilinear relation with one-another.

4. The carrying case of claim 1, wherein said housing is comprised of five rectangular panels, a first and second of said panels being of like dimensions and fixed in opposed parallel relation to one another, a third and fourth of said panels being of like dimensions and fixed in opposed parallel relation to one another, a remaining fifth panel being fixed in perpendicular relation to said first, second, third and fourth panels such that each one of said fifth panel's edges meets an edge of each of first, second, third and fourth panels, thereby defining a rectilinear cavity within said housing.

5. The carrying case of claim 4, wherein said first and second panels define a top and bottom walls of said housing, and said third and fourth panels define left and right side walls of said housing, and said fifth panel defines a rear wall of said housing.

6. The carrying case of claim 1, wherein said housing is comprised of five rectangular panels, a first of said panels defining a top wall thereof, a second of said panels defining a bottom wall thereof, a third of said panels defining a left wall thereof, a fourth of said panels defining a right wall thereof, and a fifth of said panels defining a rear wall thereof.

7. The carrying case of claim 6, wherein said hinged panel, when fastened in a closed position, defines a front wall of said housing.

8. The carrying case of claim 1, wherein said hinged panel includes a closure flap bearing said fastening means.

9. The carrying case of claim 1, wherein said fastening means includes a closure flap hingedly affixed to said hinged panel.

10. The carrying case of claim 9, wherein said fastening means further includes a pair of mating patches of hook and loop fabric fastener, a first patch of said pair being affixed to said closure flap, a second patch of said pair being affixed to said housing.

11. The carrying case of claim 1, wherein said drawer supporting means comprises a mating track and runner.

12. The carrying case of claim 1, wherein said drawer supporting means is adapted to support a plurality of drawers.

13. The carrying case of claim 1, wherein said carrying case includes a plurality of said drawers.

14. The carrying case of claim 1, wherein said drawer includes upstanding side walls, each said drawer side wall including a longitudinal track therein adapted to receive a mating drawer runner.

15. The carrying case of claim 1, wherein said housing includes opposed side walls, each said side wall having a projecting longitudinal drawer runner adapted to engage a mating track in said drawer.

16. The carrying case of claim 1, wherein each said drawer includes a bottom, and upstanding front, rear and side walls.

17. The carrying case of claim 1, wherein said drawer dividing means comprises a thin, upstanding fence.

18. The carrying case of claim 1, wherein said drawer dividing means divides said drawer into nine identically-dimensioned article compartments.

19. The carrying case of claim 18, wherein each said article compartment is square.

20. The carrying case of claim 19, wherein each said article compartment is dimensioned to receive an individual compact disc housing.

21. The carrying case of claim 20, wherein said carrying case includes a plurality of said drawers.

22. The carrying case of claim 1, wherein said opening in said drawer's bottom is substantially as large as said article compartment.

23. The carrying case of claim 1, wherein said opening in said drawer's bottom is surrounded by a skirt adapted to support an article in said article compartment.

24. The carrying case of claim 1, wherein each said non-projecting drawer pull comprises an opposed pair of cutouts.

25. The carrying case of claim 24, wherein said cutouts are semicircular.

26. A carrying case for planar, rectangular articles of minimal thickness, comprising:

a. a rectilinear housing having an open side;

b. a panel hingedly affixed to said housing adjacent said open side, and of dimensions sufficient to close said open side;

c. means for releasably fastening said hinged panel in a position to close said housing's open side;

d. a plurality of opposed pairs of drawer supports on inner surfaces of said housing;

e. a plurality of drawers, each said drawer being slidably engaged with an opposed pair of said drawer supports;

f. each said drawer having a bottom, upstanding front, rear and side walls, and a plurality of thin, upstanding fences dividing said drawer's interior space, said fences being rectilinearly oriented and defining a plurality of article compartments;

g. an opening in said drawer bottom beneath each said article compartment; and, h. an opposed pair of semicircular cutouts in said front wall of each said drawer.

27. A carrying case for planar, rectangular articles of minimal thickness, comprising:

a. a housing comprised of six rectangular side panels, wherein five of said side panels are integrally bound into a fixed rectilinear relation with one-another, leaving a remaining sixth side open, and wherein a sixth of said side panels is hinged at one edge to a free edge of one of said five side panels;

b. means at an edge opposed to said hinged edge of said sixth side panel for releasably fastening said opposed edge to yet another of said five side panels to permit said sixth side panel to cover said open sixth side;

c. a plurality of opposed pairs of drawer supports on inner surfaces of said housing;

d. a plurality of drawers, each said drawer being slidably engaged with an opposed pair of drawer supports;

e. each said drawer having a bottom, upstanding front, rear and side walls, and a plurality of thin, upstanding fences dividing said drawer's interior space, said fences being rectilinearly oriented and defining a plurality of article compartments;

f. an opening in said drawer bottom beneath each said article compartment; and, g. an opposed pair of semicircular cutouts in said front wall of each said drawer.

* * * * *